(12) United States Patent
Dennis et al.

(10) Patent No.: US 8,833,105 B2
(45) Date of Patent: Sep. 16, 2014

(54) METHOD AND APPARATUS FOR MAKING VACUUM INSULATED GLASS (VIG) WINDOW UNIT INCLUDING PUMP-OUT TUBE SEALING TECHNIQUE

(75) Inventors: Timothy A. Dennis, Bloomdale, OH (US); Andrew W. Pantke, Belleville, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 301 days.

(21) Appl. No.: 13/474,819

(22) Filed: May 18, 2012

(65) Prior Publication Data

US 2013/0305785 A1 Nov. 21, 2013

(51) Int. Cl.
*C03B 29/02* (2006.01)
*E06B 3/677* (2006.01)
*E06B 3/66* (2006.01)

(52) U.S. Cl.
CPC ............. *E06B 3/6612* (2013.01); *E06B 3/6775* (2013.01)
USPC .................. 65/34; 65/138; 156/104; 156/109; 264/102; 428/34; 445/43

(58) Field of Classification Search
CPC ...... E06B 3/6612; E06B 3/6775; E06B 3/677
USPC ............... 65/34, 138, 155; 264/102; 156/104, 156/109; 428/34; 445/43
See application file for complete search history.

(56) References Cited

U.S. PATENT DOCUMENTS

| | | | |
|---|---|---|---|
| 2,749,579 | A | 3/1954 | Shaw |
| 5,657,607 | A | 8/1997 | Collins et al. |
| 5,664,395 | A | 9/1997 | Collins et al. |
| 5,897,927 | A | 4/1999 | Tsai et al. |
| 5,902,652 | A | 5/1999 | Collins et al. |
| 6,383,580 | B1 | 5/2002 | Aggas |
| 6,506,272 | B1 | 1/2003 | Aggas |
| 6,506,472 | B1 | 1/2003 | Tanaka et al. |

(Continued)

FOREIGN PATENT DOCUMENTS

| | | |
|---|---|---|
| EP | 1 571 134 | 9/2005 |
| JP | 10-2161 | 1/1998 |

(Continued)

OTHER PUBLICATIONS

U.S. Appl. No. 13/474,835, filed May 18, 2012; Dennis et al.

(Continued)

*Primary Examiner* — Queenie Dehghan
(74) *Attorney, Agent, or Firm* — Nixon & Vanderhye P.C.

(57) ABSTRACT

A method for making a vacuum insulated glass window assembly is provided in which an exposed end of a pump-out tube of a vacuum insulated glass window assembly is sealed using a laser that is applied to the end of the pump out tube in controlled sequential manner as opposed to a short duration, high-powered application of a laser. In particular, a method is disclosed in which a multiphase sequential variable power application of laser energy to an exposed end of a pump-out tube for controlled exposure times and decreasing laser trace diameters produces a more controlled melting of the tube glass to reduce or eliminate undesirable outgassing that may occur during a high-power short duration exposure of laser energy to the end of the pump-out tube to seal the tube.

20 Claims, 7 Drawing Sheets

(56) References Cited

U.S. PATENT DOCUMENTS

| | | |
|---|---|---|
| 8,137,494 B2 | 3/2012 | Cooper et al. |
| 2004/0253395 A1 | 12/2004 | Amari et al. |
| 2009/0151853 A1* | 6/2009 | Cooper ............ 156/104 |
| 2009/0155500 A1 | 6/2009 | Cooper et al. |
| 2013/0153551 A1* | 6/2013 | Dear ............ 219/121.66 |

FOREIGN PATENT DOCUMENTS

| | | |
|---|---|---|
| JP | 2002-012455 | 1/2002 |
| JP | 2004-168627 | 6/2004 |
| WO | WO 91/02878 | 3/1991 |
| WO | WO 97/48650 | 12/1997 |

OTHER PUBLICATIONS

U.S. Appl. No. 13/474,850, filed May 18, 2012; Dennis et al.
U.S. Appl. No. 13/354,963, filed Jan. 20, 2012; Dennis.
International Search Report mailed Sep. 23, 2013.

* cited by examiner

METHOD AND APPARATUS FOR MAKING VACUUM INSULATED GLASS (VIG) WINDOW UNIT INCLUDING PUMP-OUT TUBE SEALING TECHNIQUE

CROSS-REFERENCE TO RELATED APPLICATIONS

This application is related to commonly assigned U.S. patent application Ser. Nos. 13/474,835 and 13/474,850, filed concurrently herewith, the disclosures of which are incorporated by reference herein in their entireties.

TECHNICAL FIELD

This disclosure relates generally to vacuum insulated glass (VIG) window unit configurations and methods for making a VIG window unit. The disclosure more particularly relates to methods for sealing an end of a pump-out tube (e.g., by laser). The disclosure even more particularly relates to a multiphase sequential variable power application of laser energy to an exposed end of a pump-out tube for controlled exposure times and decreasing laser trace diameters to produce a more controlled melting of the tube glass to reduce or eliminate undesirable outgassing that may occur during a high-power short time application of laser energy to the end of the pump-out tube to seal the tube.

BACKGROUND AND SUMMARY OF EXAMPLE EMBODIMENTS

Vacuum insulating glass (VIG) units typically include at least two spaced apart glass substrates that enclose an evacuated or low-pressure space/cavity therebetween. The substrates are interconnected by a peripheral edge seal and typically include spacers between the glass substrates to maintain spacing between the glass substrates and to avoid collapse of the glass substrates that may be caused due to the low pressure environment that exists between the substrates. Some example VIG configurations are disclosed, for example, in U.S. Pat. Nos. 5,657,607, 5,664,395, 5,657,607, 5,902,652, 6,506,472 and 6,383,580 the disclosures of which are all hereby incorporated by reference herein in their entireties.

Figure 1:
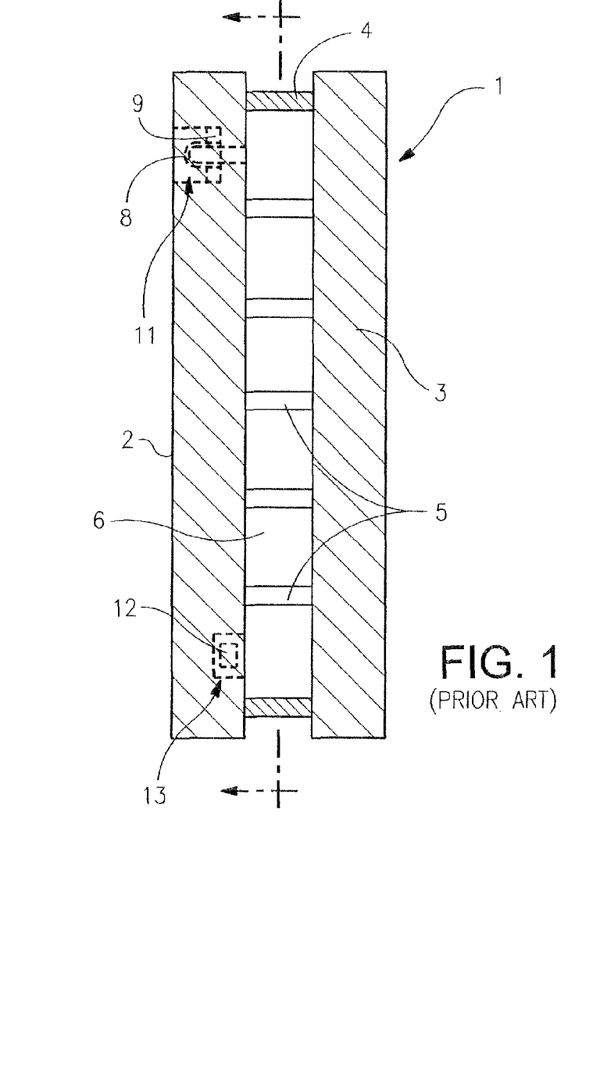
FIG. 1 is a cross sectional schematic diagram of a conventional VIG unit.
Figure 2:
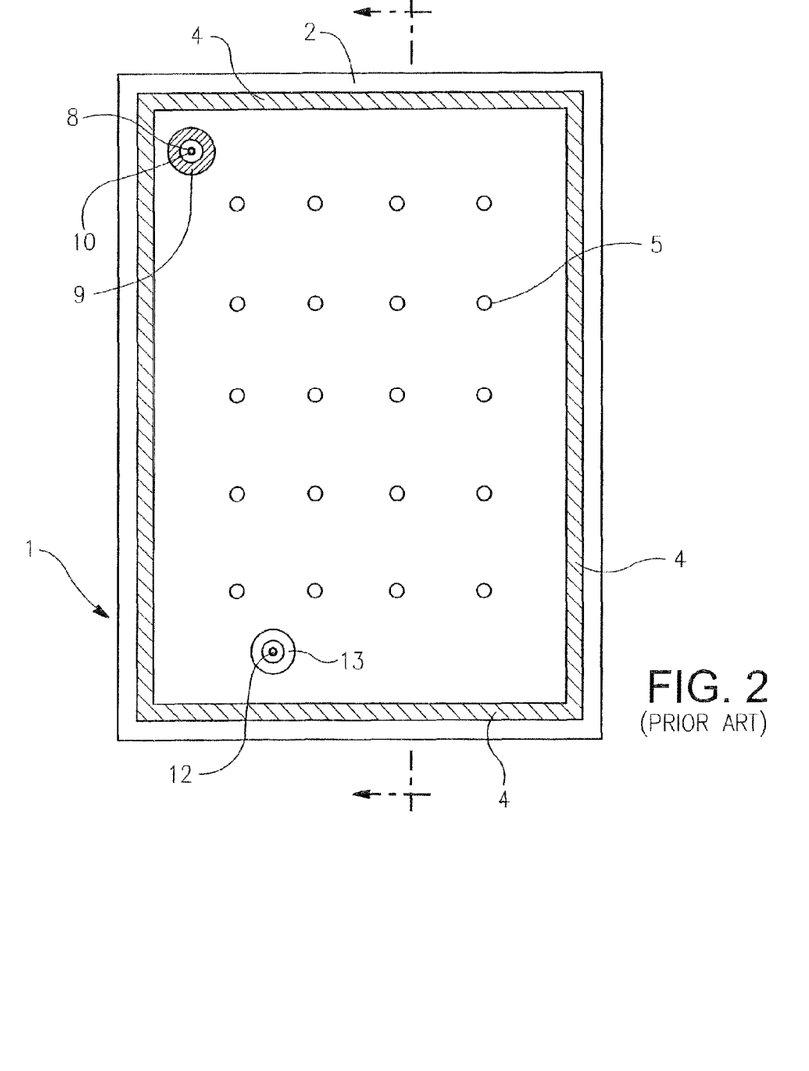
FIG. 2 is a top plan view of a conventional VIG unit.

FIGS. 1 and 2 illustrate a typical VIG window unit 1 and elements that form the VIG window unit 1. For example, VIG unit 1 may include two spaced apart substantially parallel glass substrates 2, 3, which enclose an evacuated low-pressure space/cavity 6 therebetween. Glass sheets or substrates 2,3 are interconnected by a peripheral edge seal 4 which may be made of fused solder glass, for example. An array of support pillars/spacers 5 may be included between the glass substrates 2, 3 to maintain the spacing of substrates 2, 3 of the VIG unit 1 in view of the low-pressure space/gap 6 present between the substrates 2, 3.

A pump-out tube 8 may be hermetically sealed by, for example, solder glass 9 to an aperture/hole 10 that passes from an interior surface of one of the glass substrates 2 to the bottom of an optional recess 11 in the exterior surface of the glass substrate 2, or optionally to the exterior surface of the glass substrate 2. A vacuum is attached to pump-out tube 8 to evacuate the interior cavity 6 to a low pressure, for example, using a sequential pump down operation. After evacuation of the cavity 6, a portion (e.g., the tip) of the tube 8 is melted to seal the vacuum in low pressure cavity/space 6. The optional recess 11 may retain the sealed pump-out tube 8. Optionally, a chemical getter 12 may be included within a recess 13 that is disposed in an interior face of one of the glass substrates, e.g., glass substrate 2. The chemical getter 12 may be used to absorb or bind with certain residual impurities that may remain after the cavity 6 is evacuated and sealed.

VIG units with fused solder glass peripheral edge seals 4 are typically manufactured by depositing glass fit, in a solution (e.g., frit paste), around the periphery of substrate 2 (or on substrate 3). This glass frit paste ultimately forms the glass solder edge seal 4. The other substrate (e.g., 3) is brought down on substrate 2 so as to sandwich spacers/pillars 5 and the glass frit solution between the two substrates 2, 3. The entire assembly including the glass substrates 2, 3, the spacers/pillars 5 and the seal material (e.g., glass frit in solution or paste), is then heated to a temperature of at least about 500° C., at which point the glass frit melts, wets the surfaces of the glass substrates 2, 3, and ultimately forms a hermetic peripheral/edge seal 4.

After formation of the edge seal 4 between the substrates, a vacuum is drawn via the pump-out tube 8 to form low pressure space/cavity 6 between the substrates 2, 3. The pressure in space 6 may be produced by way of an evacuation process to a level below atmospheric pressure, e.g., below about $10^{-2}$ Torr. To maintain the low pressure in the space/cavity 6, substrates 2, 3 are hermetically sealed. Small high strength spacers/pillars 5 are provided between the substrates to maintain separation of the approximately parallel substrates against atmospheric pressure. As noted above, once the space 6 between substrates 2, 3 is evacuated, the pump-out tube 8 may be sealed, for example, by melting its tip using a laser or the like.

A typical process for installing the pump-out tube 8 in the hole or aperture 10, includes inserting a pre-formed glass pump-out tube 8 in an aperture/hole 10 that has previously been formed (e.g., by drilling) in one of the glass substrates 2. After the pump-out tube 8 has been seated in the aperture/hole 10, an adhesive fit paste is applied to the pump-out tube 8, typically in a region close to the opening of the hole 10 proximate an exterior surface of the glass substrate 2. As noted above, the pump-out tube may be sealed after evacuation or purging of the VIG cavity.

After evacuation of the cavity to a pressure less than atmospheric, sealing of the pump-out tube may be accomplished by heating an end of the pump-out tube that is used to evacuate or purge the cavity to melt the opening and thus seal the cavity of the VIG window unit. For example and without limitation, this heating and melting may be accomplished by laser irradiation of the tip of the pump-out tube.

However, it has been found that application of laser energy to the tip of the pump-out tube can be controlled to achieve more reliable sealing. As noted above, a heat conduction problem from the end of the pump-out tube to the frit interface may result in undesirable cracking of the pump-out tube at the frit interface which may compromise the vacuum in the cavity of the VIG window unit. Faster laser processing may be used in an effort to reduce the exposure of the glass pump-out tube to the laser and reduce the time allowed for heat to conduct through the pump-out tube, and thus reduce the probability of heat conduction to the frit and potential cracking at the interface of the pump-out tube and the fit. However, fast constant/continuous laser processing in a single manner with high laser power suffers from the drawback of potentially super heating the glass of the pump-out tube and potentially boiling off the top layer of the glass pump-out tube. Significant outgassing may occur if the top layer of the glass pump-out tube is allowed to boil. This outgassing may undesirably decrease the vacuum already pumped down in the VIG window cavity, resulting in an undesirable decrease of the insulating (or "R") value of the resulting VIG window unit. Therefore, what is needed is a way to seal the end of the glass pump-out tube so that sufficient energy is provided to melt the end of the tube, while at the same time avoiding boiling of the end of the glass pump-out tube during sealing to avoid potential detrimental outgassing. In addition, it is preferable to heat the end of the pump-out tube in such a way as to avoid cracking of the pump-out tube at the tube/frit interface.

To overcome these drawbacks a new way of sealing the end of the pump out tube is provided according to certain example embodiments disclosed herein. For example, instead of using a fast high-powered sealing process, a process using sequential multiple applications of laser energy using variable power settings, controlled exposure times and sequentially reducing a diameter of the laser path or trace provides a more controlled melting of the tube glass, resulting in lower outgassing according to certain example embodiments. While the process according to certain example embodiments is slower which may potentially result in greater heat conduction through the pump-out tube, the process is balanced with controlling the length of the pump-out tube as set forth above to control the distance from the top of the frit to the top of the pump-out tube. According to further example embodiments, a cycle of repeated exposure of the pump out tube to different energy levels of the laser for controlled times provides further advantages and helps to avoid or prevent outgassing. For example, and without limitation, a multi-cycle melting (or "tip off") process may include a first pre-melt cycle, at least a second core heating cycle and a plurality of chase cycles that eventually melt and seal off the tip of the pump-out tube. Various combinations of power, repetitions and cycles may be implemented according to certain example embodiments disclosed herein.

These and other advantages are provided by a method of making a vacuum insulated glass window unit, the method comprising: providing a vacuum insulated glass window comprising: a first substrate having a pump-out tube disposed in a hole formed in the first substrate; a second substrate; and an edge seal, the first and second substrates arranged to sandwich the edge seal and form a cavity therebetween; sealing an end of the pump-out tube extending out of the first substrate, the sealing step comprising: performing at least one preheating treatment to clean a top of the pump-out tube and to begin heating the top of the pump-out tube; performing at least one core heating treatment to melt the top of the pump-out tube; and performing a plurality of chase treatments using successively reduced laser trace diameters to seal the tube.

These and other embodiments and advantages are described herein with respect to certain example embodiments and with reference to the following drawings in which like reference numerals refer to like elements, and wherein:

DETAILED DESCRIPTION OF EXAMPLE EMBODIMENTS

Certain example embodiments will be described in detail herein with reference to the foregoing drawings in which like reference numerals refer to like elements. It will be understood that the embodiments described herein are intended to be illustrative, not limiting, and that those skilled in the art will understand that various modifications may be made without departing from the true spirit and full scope of the claims appended hereto.

Figure 4:
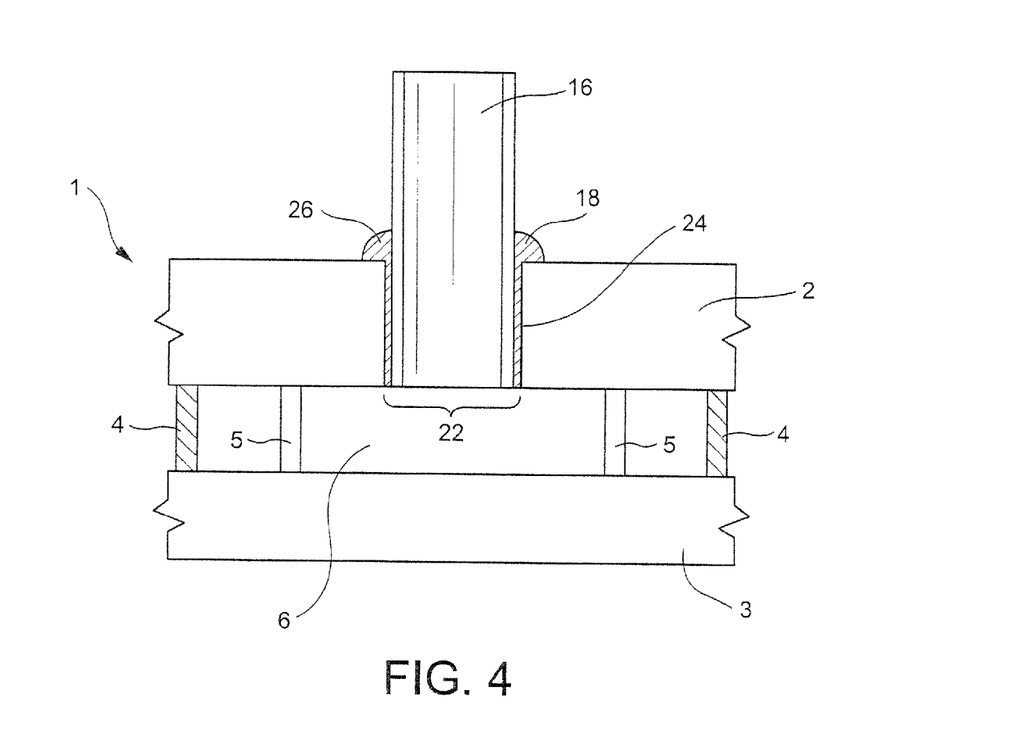
FIG. 4 is a schematic partial cross section al diagram illustrating an example pump-out tube inserted in a glass substrate of a VIG window unit according to an example embodiment.
Figure 6:
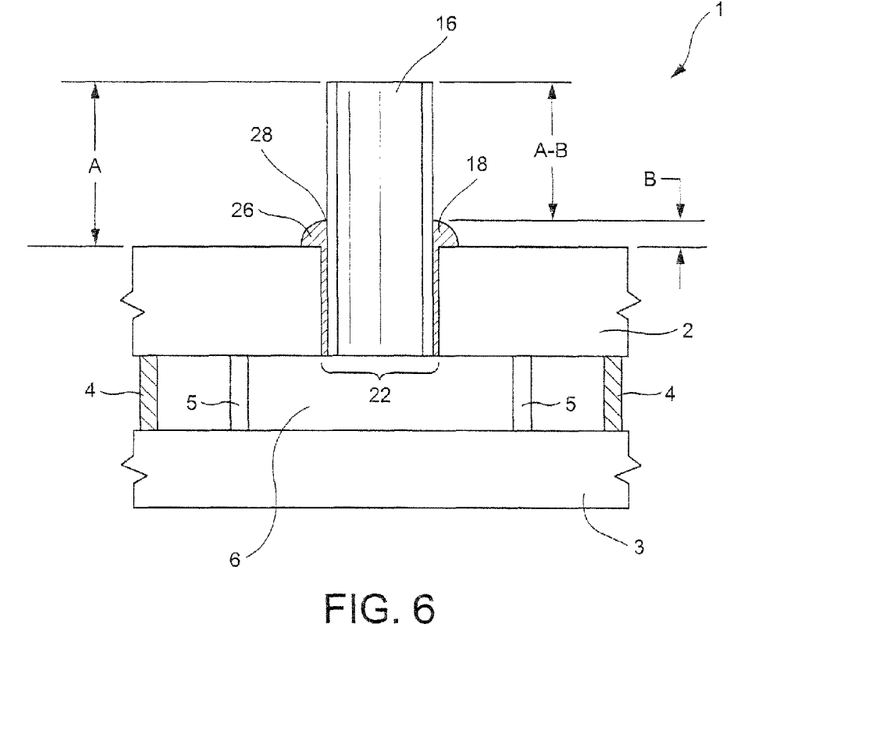
FIG. 6 is a schematic partial cross section al diagram illustrating an example pump-out tube inserted in a glass substrate of a VIG window unit according to an example embodiment.

With reference to FIGS. 4 and 6, a schematic cross sectional view of an example VIG window unit 1 is illustrated. The VIG window unit 1 includes spaced apart first and second transparent glass substrates 2, 3 that may be interconnected by an edge seal 4, which may, for example, and without limitation, be of or include a vanadium based or VBZ type seal or a solder glass type seal. Example vanadium based or VBZ type seal compositions are disclosed in U.S. patent application Ser. No. 13/354,963, filed Jan. 20, 2012, the disclosure of which is incorporated by reference herein in its entirety. VBZ (e.g., vanadium, barium, zinc) based seal compositions are discussed in Ser. No. 13/354,963, and may be used for the edge seal 4 and/or frit based tube seal 18, 26 in certain example embodiments. Conventional solder glass frit material may also be used for the edge seal 4 and/or the frit based tube seal 18, 26 in certain example embodiments. When using VBZ type seal compositions, a lower temperature sealing thermal profile is used to maintain the desired temper of the glass of the VIG unit because VBZ compositions have a lower firing temperature (e.g., <250° C.) than certain other conventional glass frit compositions that may be used to form seals in VIG units. It will be understood that the embodiments disclosed herein are equally applicable to VIG configurations using any suitable seal material.

In certain embodiments, the transparent glass substrates 2, 3 may be approximately the same size. However, in certain other example embodiments, one glass substrate may be larger than the other to provide, for example, an approximately L-shaped step proximate an edge of the VIG unit. One or both of the glass substrates 2, 3 may also optionally include at least one coating material (not shown), such as, for example, and without limitation, a low-E coating. It will be understood that various coatings may be present on an interior surface of at least one of the glass substrates 2, 3, and that such coatings provide various beneficial performance characteristics to the VIG window unit 1. In certain example embodiments, the VIG window unit has a visible transmission of at least about 30%, more preferably of at least about 40%, even more preferably of at least about 50%, and even more preferably of at least about 60% or 70%.

An array of support pillars/spacers 5 may also be included between the glass substrates 2, 3 to maintain the spacing of the substrates in view of the lower than atmospheric pressure that is ultimately provided in cavity 6 between the substrates 2, 3. In certain example embodiments, the spacers may have a height, for example, of about 0.1 to 1.0 mm, more preferably from about 0.2 to 0.4 mm. The height of the spacers may define the height of the vacuum cavity 6. As noted above, the spacers 5 are preferably of a size that is sufficiently small so as to be visibly unobtrusive. According to certain example embodiments, the spacers may be made of or include solder glass, glass, ceramic, metal, polymer, or any other suitable material. Additionally, the spacers 5 may be, for example, generally cylindrical, round, spherical, dime-shaped, C-shaped, pillow-shaped or any other suitable shape.

A pump-out tube 16, that may be hermetically sealed, for example, using solder glass is provided through a hole 22 that passes from an interior surface of one of the glass substrates, e.g., substrate 2 and through the glass substrate 2 and extending beyond the outside surface thereof. The pump-out tube 16 is used in a process to evacuate the cavity 6 between the substrates 2, 3, such as, for example, by attaching a vacuum pump to the pump-out tube 16 and evacuating the cavity to a low pressure, e.g., a pressure lower than atmospheric pressure. In a preferred example, a pressure in the cavity 6 is, for example, preferably below about $10^{-2}$ Torr, and more preferably below about $10^{-3}$ Torr, and even more preferably below about $5 \times 10^{-4}$ Torr. After evacuating the cavity 6, the pump-out tube 16 may be sealed, for example, by melting the tip of the tube 16 by any suitable means, such as, for example, by laser. VIG window units may be used, for example, and without limitation, as windows in residential homes, office buildings, apartment buildings, doors, and/or the like.

According to certain example embodiments, a method of making a VIG window unit is disclosed. Certain example methods of installing a pump-out tube in a hole in a glass substrate of the VIG window unit in a manner to reduce or avoid depositing frit material too high up the pump-out tube are provided. According to certain example embodiments, instead of applying the wet frit material to a pump-out tube that has already been inserted in a hole formed in a glass substrate of the VIG window unit, wet frit material may first be applied to a lower portion of a pump-out tube, prior to insertion in the hole. After application of the wet frit to a lower portion of the pump-out tube, the pump-out tube, including the wet frit material disposed on a lower portion thereof, is then inserted in the hole with the lower portion of the pump-out tube being inserted in the hole, and an upper portion of the pump-out tube remaining exposed (e.g., outside the hole). Installing the pump-out tube in this manner keeps the frit material closer to or proximate the hole and also facilitates beneficial deposition of frit material in the hole and along the interior sidewalls of the hole providing further advantageous hermetic sealing of the pump-out tube in the hole and to the substrate. In addition, a certain amount of excess frit material that may not fit in the hole may be pushed out of the hole and form a bump or shoulder of frit material at an area proximate where the hole exits the outer surface of the substrate (e.g., where the pump-out tube enters the hole) and surrounding a portion of the pump-out tube in the same area. This bump/shoulder has a height referred to herein as frit height. Providing this additional amount of frit material surrounding and filling the outer opening of the hole in the glass substrate provides additional advantageous hermetic sealing of the pump-out tube. As with the various embodiments discussed herein, embodiments relating to the frit being applied to the tube prior to insertion of the tube into the hole in the substrate may or may not be in combination with other example embodiments disclosed herein.

According to certain example embodiments frit paste may be applied to a lower portion of the pump-out tube so that it substantially surrounds an outer circumference of a lower portion of the tube, such as, for example, in a generally annular shape, such as, for example, and without limitation, an annulus or an annular cylinder shape, or the like. This may be accomplished, for example, and without limitation, by applying the frit paste in a rotational manner to the pump-out tube to form of, for example, and without limitation, an area of wet frit substantially surrounding an outer circumferences of the pump-out tube at a lower portion thereof, that may, for example, and without limitation have a generally annular shape. The pump-out tube including the applied wet frit paste may then be inserted (frit paste end first) into the hole formed in the glass substrate. According to certain example embodiments, the volume of frit paste material applied to the end portion of the pump-out tube should be sufficient to fill the hole gap (e.g., the gap between the exterior surface of the pump-out tube and the sidewalls of the hole formed in the glass substrate) and produce a small mound or shoulder of frit on the top of the glass substrate to provide the benefits noted above, including, but not limited to, formation of a good hermetic seal after firing around the tube and the top of the glass substrate. According to further example embodiments, it may be preferable to dry the frit after insertion of the pump-out tube to provide sufficient adhesion strength to hold the pump-out tube firmly in place prior to firing. Such drying may include, for example, and without limitation, air drying and/or the application of heat.

Figure 3:
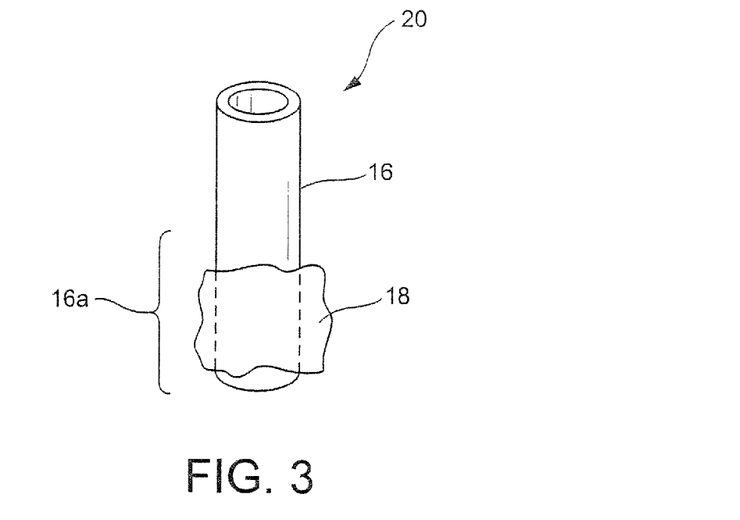
FIG. 3 is a schematic partial cross sectional diagram illustrating an example pump-out tube with frit paste applied thereto according to an example embodiment.

FIG. 3 is a schematic partial cross sectional diagram illustrating an example pump-out tube with frit paste applied thereto according to an example embodiment. As shown in FIG. 3, an example pump-out tube 16 may be provided with an amount of, for example, wet frit material 18, substantially surrounding a lower portion 16a of the pump-out tube 16. As noted above, according to an example, non-limiting illustration, the fit material 18 may be applied to the lower portion 16a of the pump-out tube 16 by applying the frit material 18 while simultaneously rotating the pump-out tube 16 or vice versa (e.g., rotating a frit paste applicator about the pump-out tube). Of course, any other manner of applying the frit material 18 to the lower portion 16a of the pump-out tube 16 may be used, so long as the frit material 18 is disposed at a lower portion 16a of the pump-out tube 16, and substantially surrounds the pump-out tube 16. After application of the wet frit material 18 to the lower portion 16a of the pump-out tube 16, the tube and paste assembly 20, may then be inserted into a hole 22 formed in a glass substrate 2 of the VIG window unit. According to certain example embodiments, it may be preferable that the fit paste be substantially deposited around about the lower one-fourth to one-half of the tube, or more preferably around about the lower one-fourth to one-third of the tube, and even more preferably around about the lower one-fourth of the tube.

Referring now to FIG. 4, a schematic partial cross section al diagram illustrating an example pump-out tube 16 inserted in a hole 22 formed in a glass substrate 2 of a VIG window unit according to an example embodiment is shown. According to certain example embodiments, after application of the wet frit 18 to a lower portion 16a of the pump-out tube 16, the pump-out tube 16, including the wet frit material 18 disposed on a lower portion thereof 16a, is then inserted in the hole 22 formed in the glass substrate 2. According to certain example embodiments, all or part of the lower portion 16a of the pump-out tube 16 is inserted into the hole 22, and an upper portion of the pump-out tube 16 remains exposed (e.g., outside the hole 22). Installing the pump-out tube 16 in this manner keeps the frit material 18 closer to or proximate the hole and also facilitates beneficial deposition of frit material 18 in the hole 22 and along the interior sidewalls 24 of the hole 22 as shown in FIG. 4 providing further advantageous hermetic sealing of the pump-out tube 16 in the hole 22 and to the substrate 2. In addition, a certain amount of excess fit material 18 may be pushed out of the hole 22 during the insertion process, and form a bump/shoulder of frit material 26 at an area proximate where the tube exits the outer surface of the substrate 2 (e.g., where the pump-out tube enters the hole) and surrounding a portion of the pump-out tube 16 in the same area. A height of this bump/shoulder 26 may be referred to herein as frit height. Providing this additional amount of frit material 18 surrounding and filling the outer opening of the hole 22 in the glass substrate 2 provides additional advantageous hermetic sealing of the pump-out tube after firing. While the tube 16 is inserted into glass substrate 2 in FIG. 4, it will be appreciated that the tube 16 may instead be inserted into a similar hole in glass substrate 3 in alternative example embodiments of this invention.

Figure 5:
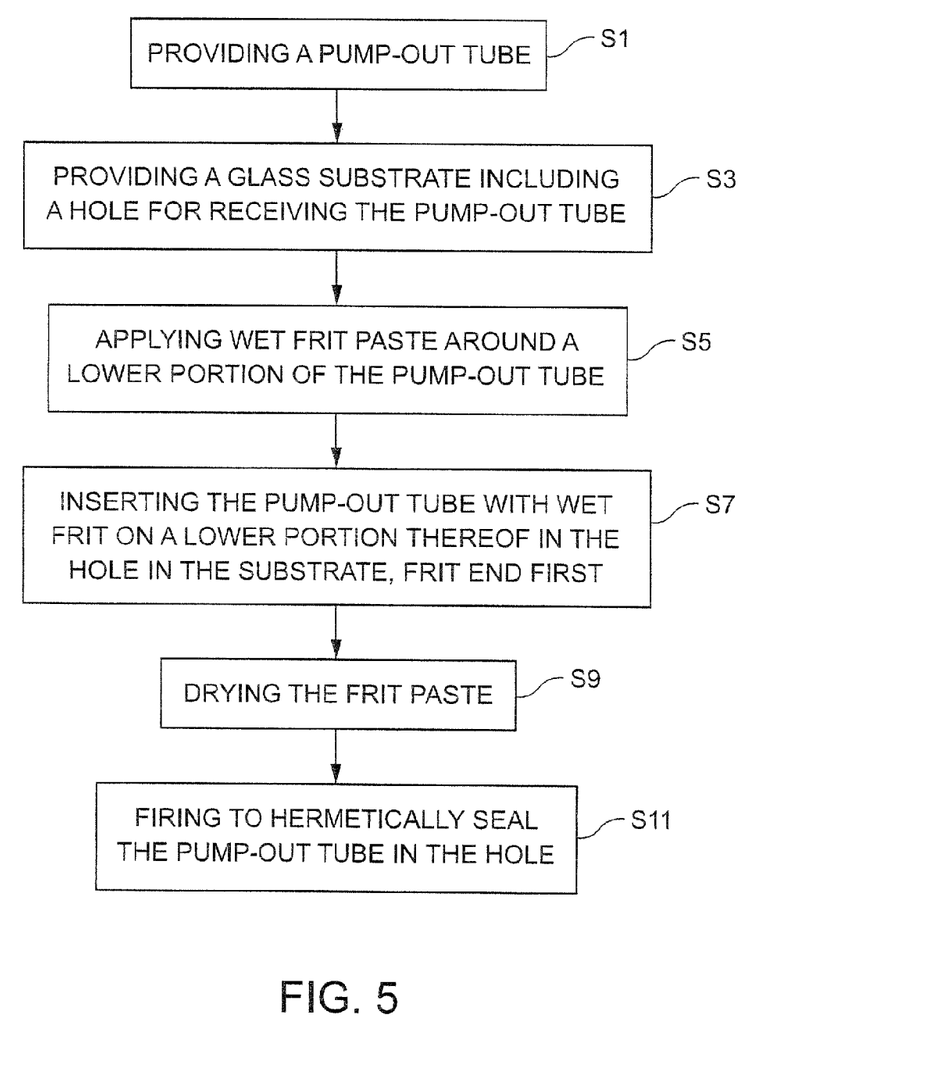
FIG. 5 is a flow chart illustrating a method of making a VIG window unit according to an example embodiment.

FIG. 5 is a flowchart illustrating a method of inserting and sealing a pump-out tube in making a VIG window unit according to certain example embodiments. While the method illustrated in FIG. 5 is primarily concerned with insertion of the pump-out tube and adhesive frit paste in the hole formed in the substrate of the VIG window unit, it will be understood that this is part of an overall method for making a VIG window unit. Turning to FIG. 5, a pump-out tube 16, for example, preferably of glass is provided at S1. A glass substrate 2 including a hole 22 formed therein is also provided at S3. It will be understood that the substrate 2 may be provided separately or as part of a partially completed VIG window unit assembly. Wet frit paste 18 is then applied to a lower portion 16a of the pump-out tube 16 (S5), as described above. For example, and without limitation, the wet frit paste 18 is applied so that it substantially surrounds a lower portion 16a of the pump-out tube 16 as shown in FIG. 3 as described above. According to certain example embodiments, the frit paste 18 may be applied while rotating the pump-out tube 16 to substantially dispose wet fit paste 18 around an outer circumference of the pump-out tube or vice versa. The resulting applied wet frit paste 18 may have a generally annular shape, such as, for example, a donut shape, an annular cylindrical shape or the like. According to certain example embodiments, it may be preferable that the frit paste be deposited around about the lower one-fourth to one-half of the tube, or more preferably around about the lower one-fourth to one-third of the tube, and even more preferably around about the lower one-fourth of the tube. After application of the wet frit 18 to the pump-out tube 16 (S5), the pump-out tube 16 with the frit 18 applied to a lower portion 16a thereof 20 is then inserted into the hole 22 formed in the glass substrate 2, frit end first S7. In other words, according to an example embodiment, the end 16a of the pump-out tube 16 to which the wet frit paste 18 is applied, is inserted into the hole 22 in the glass substrate 2 (S7). The frit 18 substantially fills the areas of the hole 22 not occupied by the tube 16, and may, in a preferred example, be of sufficient volume to cover the sidewalls 24 of the hole 22. In addition, an amount of frit paste 18 may, according to a preferred example, form a bump or shoulder 26 surrounding the pump-out tube 16 at the top opening of the hole 22 and covering the hole. As noted above, this bump or shoulder 26 may provide sealing advantages when the assembly is fired. The partial assembly including the glass substrate 2, with the pump-out tube and fit material 20 may then be allowed to dry. According to certain example embodiments, it may be preferable that the adhesive frit material provide sufficient green strength to hold the pump-out tube 16 in place until firing. In this regard, according to certain example embodiments, the frit 18 may be allowed to air dry or may optionally be dried by heating or any combination of both methods (S9). After the paste has dried (S9), according to certain example embodiments, the frit 18 (e.g., solder glass based frit, or VBZ based frit) in the hole 22 and surrounding the pump-out tube 16 and the surface of the hole is fired so that the frit forms a hermetic seal (e.g., glass based seal) about the pump-out tube 16 and in the hole 22 along the sidewalls 24 thereof. Further steps may then be performed to produce a final commercial VIG window unit, including, for example, evacuating the cavity between the glass substrates and sealing the top of the pump-out tube as discussed below. Providing a pump-out tube in the manner described above in certain example embodiments may overcome issues with residual fit paste remaining at an upper portion of the pump-out tube and interfering with subsequent processes for sealing the pump-out tube after evacuation of the cavity 6 of the VIG unit via the tube. The method described above also provides a good hermetic seal between the pump-out tube and the glass substrate.

Certain other example embodiments relate to controlling a distance between the top of the fit used to adhere the pump-out tube in the hole, and the end of the pump-out tube subjected to subsequent heat sealing. As with the various embodiments discussed herein, embodiments relating to controlling this distance may or may not be used in combination with other embodiments such as inserting the tube into the hole with sealing material already thereon. In certain instances, it was found that the vacuum atmosphere degraded after heat sealing an end of the pump-out tube. In some instances the leakage was rapid, while in other cases, the leakage occurred over a longer period, such as, for example, over the course of several days. It was discovered that cracks in the pump-out tube at an area at or near an interface of the pump-out tube and frit, such as, for example, where the top of the frit meets the glass of the pump-out tube, substantially contributed to the loss of vacuum in the cavity of the VIG window unit. After substantial investigation, it was determined that in certain cases the heat used to seal the upper (or outer) end of the pump-out tube may be conducted through the pump-out tube glass to the frit, resulting in thermal shocking of the glass pump-out tube in the vicinity of the frit-tube interface due to, for example, the temperature differential between the frit and the glass tube, which caused cracking of the pump-out tube in the area of the frit interface between the pump-out tube and the frit material. As noted above, the temperatures required to melt the end of the pump-out tube are typically very high. Cracking of the pump-out tube at the frit interface was discovered to be a cause of air leakage that may compromise the vacuum of the VIG window unit. It has been further found that heat conduction is dependent on a length of the pump-out tube. In other words, it has been surprisingly found that if the distance between the top of the frit used to adhere the pump-out tube in the hole, and the end of the pump-out tube subjected to heat sealing, such as, for example, by laser heating, is too short, the potential for heat conduction to the fit, and thus thermal shocking of the pump-out tube at the interface of the pump-out tube and the frit, is increased. Therefore, a VIG window unit construction in which a length of the pump-out tube, and more particularly, a length between the top of the frit and the end of the pump-out tube that is to be heat sealed, is provided according to certain example embodiments, to be arranged to reduce the possibility of thermal shock, and thus reduce or substantially avoid cracking of the pump-out tube at the frit interface with the pump-out tube. It is also the case that the length of the pump-out tube is not too long in certain example embodiments. The pump-out tube may, for example, comprise glass and be fragile. The longer the tube, the more opportunities that exist for damaging the tube during subsequent manufacturing steps that may be employed to complete the VIG window unit. Thus, a balance can be struck between the overall length of the tube and the distance from the end of the pump-out tube and the interface of the pump-out tube with the frit material. According to certain example, non-limiting embodiments, setting a distance between the frit interface of the pump-out tube and an end of the pump-out tube to be heat sealed is preferably in a range of from about 4.5 to 6 mm, or more preferably in a range of from about 4.8-5.5 mm, and preferably about 5.0 mm. It has been found that constructing the VIG window unit to have a distance from an end of the pump-out tube to be sealed to the interface of the pump-out tube with the frit material according to certain example embodiments disclosed herein, can help overcome the problems noted above related to thermal shock during heat sealing. In addition, it has been found that these example ranges of tube length above the frit interface is also acceptable in terms of not substantially increasing the possibility or probability of damage to the tube 16 during subsequent manufacturing processes.

Referring to FIG. 6, a schematic partial cross section al diagram illustrating an example pump-out tube inserted in a glass substrate of a VIG window unit according to an example embodiment is provided. The FIG. 6 embodiment may or may not be used in combination with other embodiments such as the FIG. 3-5 embodiment(s) and/or the embodiment(s) of FIGS. 7-10. The VIG window unit includes a pump-out tube 16 inserted into a hole 22 formed in a glass substrate 2 of the VIG window unit. The pump-out tube 16 comprises, in a preferred non-limiting example, glass and is sealed in place in the hole 22 by an adhesive frit material 18 that may be fired to form a glass solder material as shown in FIG. 6. As discussed above with respect to example embodiments illustrated in FIGS. 3-5, the frit paste 18 may form a bump/shoulder 26 surrounding a portion of the pump-out tube 16, covering the hole 22 and having a frit height B. An interface of the frit shoulder 26 and the glass pump-out tube 16 is located, for example, and without limitation, at point 28 where the frit shoulder 26 meets the pump-out tube 16 as shown in FIG. 6. As noted above, cracking of the pump-out tube 16 at this interface 28, may sometimes occur due to thermal shock and the differential temperatures of glass and frit. As explained above, a solution to the thermal shock problem that occurs at the interface 28 has been found. For example, it has been found that controlling a height A of the exposed portion of the pump-out tube 16 relative to the frit height B of the frit shoulder 26 within certain ranges results in further controlling heat conduction between the pump-out tube 16 and the frit interface 28 during heat sealing of the pump-out tube. By controlling this heat conduction, it has been found that thermal shock and the resulting cracking of the pump-out tube 16 at the interface 28 may be significantly reduced and/or avoided. According to certain example embodiments, when a height difference A-B between the fit height B and the exposed pump-out tube height A is set, for example, and without limitation, to be in a range of about 4.5-6 mm, or more preferably in a range of about 4.8-5.5 mm, and more preferably about 5.0 mm, a significant reduction in thermal cracking during heat sealing of the pump-out tube may be achieved. An example method of making a VIG window unit as set forth above with respect to FIG. 5 may be used, with an additional step of selecting a height of the pump-out tube to meet, for example, preferred differential height ranges set forth above.

As noted above, the pump-out tube 16 may be sealed after evacuation/purging of the VIG window cavity 6. Sealing of the pump-out tube may be accomplished by heating an end of the pump-out tube 16 that is used to evacuate/purge the cavity 6 to melt the opening and thus seal the cavity 6 of the VIG window unit. This heating and melting may be accomplished by laser irradiation of the tip of the pump-out tube in certain example instances, which embodiments may or may not be used in combination with the embodiments of FIGS. 3-6. It has been found that it is beneficial to control the application of laser energy to the tip of the pump-out tube to achieve more reliable sealing in certain example embodiments. As noted above, a heat conduction problem from the end of the pump-out tube to the frit interface 28 may result in undesirable cracking of the pump-out tube at the frit interface which may compromise the vacuum in the cavity 6 of the VIG window unit. Faster laser processing may be used in an effort to reduce the exposure of the glass pump-out tube 16 to the laser and reduce the time allowed for heat to conduct through the pump-out tube and thus reduce the probability of heat conduction to the frit and potential cracking at the interface of the pump-out tube and the fit. However, fast laser processing and high laser power may suffer from potentially super heating the glass of the pump-out tube and potentially boiling off the top layer of the glass pump-out tube. Significant outgassing may occur if the top layer of the glass pump-out tube is allowed to boil. This outgassing may undesirably decrease the vacuum already pumped down in the VIG window cavity, resulting in an undesirable decrease of the insulating (or "R") value of the resulting VIG window unit. Therefore, in certain example embodiments there is provided a way to seal the end of the glass pump-out tube 16 so that sufficient energy is provided to melt the end of the tube, while at the same time avoiding boiling of the end of the glass pump-out tube during sealing to avoid potential detrimental outgassing. In addition, as noted above, it is preferable to heat the end of the pump-out tube in such a way as to avoid cracking of the pump-out tube at the tube/frit interface.

For example, instead of using a fast high-powered sealing process, a process using, for example, and without limitation, sequential multiple applications of laser energy using variable power settings, sequentially reducing a diameter of the laser path or trace and/or controlled exposure times provides a more controlled melting of the tube glass, resulting in lower outgassing according to certain example embodiments. The tube sealing embodiments may or may not be used in conjunction/combination with other embodiments such as the FIG. 3-6 and FIG. 8-10 embodiments. While the process according to certain example embodiments is slower so that more heat conduction might occur through the pump-out tube, the process may be balanced with controlling the length of the pump-out tube as set forth above to control the distance from the top of the frit at 28 to the top of the pump-out tube 16. According to example embodiments, a cycle of repeated exposure of the pump out tube 16 to different energy levels of the laser for controlled times provides further advantages and helps to avoid, reduce, and/or prevent outgassing. For example, and without limitation, a multi-cycle melting (or "tip off") process may include a pre-melt cycle, a core heating cycle and one or more chase cycles that eventually melt and seal off the tip of the pump-out tube. Various combinations of power, repetitions and cycles may be implemented according to certain example embodiments disclosed herein.

According to certain example embodiments, a preferred laser for use in example tube sealing embodiments disclosed herein may be, for example, YAG laser, such as, for example, and without limitation, a 20 W YAG laser. It has been found that YAG lasers provide wavelengths having particular suitability in processing glass, such as, for example, sealing a pump-out tube 16 of a VIG window unit. According to certain example embodiments, multiple sequential applications of a laser to the top or tip of the pump-out tube (e.g., an end of the pump-out tube that extends outside the cavity of the VIG window unit) are performed using variable controlled power settings, variable repetitions, and variable diameters for controlled time periods. For example, and without limitation, Table 1 illustrates the application of multiple sequential applications of a laser to seal the pump-out tube, according to certain example embodiments.

TABLE 1

| Cycle No. | Power % (Power) | Reps. | Clock Speed | Diameter |
|---|---|---|---|---|
| 1 PRE | 80% (16 W) | 10 | 25000 | 0.1350 mm |
| 2 CORE | 60% (12 W) | 70 | 25000 | 0.1350 mm |
| 3 CHASE | 60% (12 W) | 30 | 25000 | 0.1200 mm |
| 4 CHASE | 50% (10 W) | 20 | 25000 | 0.1000 mm |
| 5 CHASE | 50% (10 W) | 5 | 25000 | 0.0800 mm |

With reference to Table 1, according to an example embodiment, a first application of a laser, such as, for example, a 20 W YAG laser, is applied at 80% power (resulting in 16 W power setting for a 20 W laser) for 10 repetitions (e.g., number of times the laser travels the circumference of the tip of the pump out tube) at a clock speed (also referred to as a laser movement speed) to 25 inches/sec, and having a diameter of the circle traced by the laser of about 0.1350 mm. The first cycle according to this example, non-limiting, embodiment is referred to as a pre-treatment cycle (e.g., PRE) that is provided to preheat and prepare the top of the pump-out tube for further sequential slow sealing. For example, the PRE cycle cleans the top of the tube by burning off surface contaminants and other residual materials and begins heating of the tube to facilitate the subsequent melting process. According to certain example embodiments, the PRE cycle or treatment does not melt the tube. The PRE application is followed by a CORE application in cycle number 2 in Table 1 above, at example settings set forth in Table 1. The CORE cycle provides sufficient energy to the top of the pump-out tube to begin melting of the tube glass. According to a preferred example, the CORE process provides the bulk of the melting process. The CORE cycle may be followed, for example, by successive CHASE cycles (e.g., three in this illustration) that provide progressively lower trace diameters and lower repetitions. The CHASE cycles continue the melting of the top of the pump-out tube to successively direct the flow of the melt to the center (e.g., slump) of the top of the tube to ultimately seal the pump-out tube. Other example, non-limiting embodiments are illustrated in Tables 2-4 below. The units of Tables 2-4 are the same as those used in Table 1 above. In summary, the PRE process(es) or cycle(s)s refer to a pre-heating/pre-treatment that cleans the top of the tube and pre-heats the top of the tube to start the melting process. The CORE process(es) or cycle(s) provide the bulk of the melting process, and the CHASE process(es) or cycle(s) successively/progressively direct the flow of the melt to the center of the melting top of the tube to seal the tube.

TABLE 2

| Cycle No. | Power % (Power) | Reps. | Clock Speed | Diameter |
|---|---|---|---|---|
| 1 PRE | 40% (8 W) | 100 | 25000 | 0.1350 mm |
| 2 PRE | 80% (16 W) | 6 | 25000 | 0.1320 mm |
| 3 CORE | 60% (12 W) | 40 | 25000 | 0.1320 mm |
| 4 CHASE | 50% (10 W) | 20 | 25000 | 0.1200 mm |
| 5 CHASE | 40% (8 W) | 10 | 25000 | 0.1000 mm |
| 6 CHASE | 30% (6 W) | 5 | 25000 | 0.0800 mm |

TABLE 3

| Cycle No. | Power % (Power) | Reps. | Clock Speed | Diameter |
|---|---|---|---|---|
| 1 PRE | 30% (6 W) | 200 | 25000 | 0.1350 mm |
| 2 CORE | 50% (10 W) | 90 | 25000 | 0.1350 mm |
| 3 CHASE | 40% (8 W) | 20 | 25000 | 0.1200 mm |
| 4 CHASE | 35% (7 W) | 10 | 25000 | 0.1000 mm |
| 5 CHASE | 30% (6 W) | 5 | 25000 | 0.0800 mm |

TABLE 4

| Cycle No. | Power % (Power) | Reps. | Clock Speed | Diameter |
|---|---|---|---|---|
| 1 PRE | 30% (6 W) | 200 | 25000 | 0.1350 mm |
| 2 CORE | 60% (12 W) | 70 | 25000 | 0.1350 mm |
| 3 CHASE | 40% (8 W) | 20 | 25000 | 0.1200 mm |
| 4 CHASE | 35% (7 W) | 10 | 25000 | 0.1000 mm |
| 5 CHASE | 30% (6 W) | 5 | 25000 | 0.0800 mm |

Figure 7:
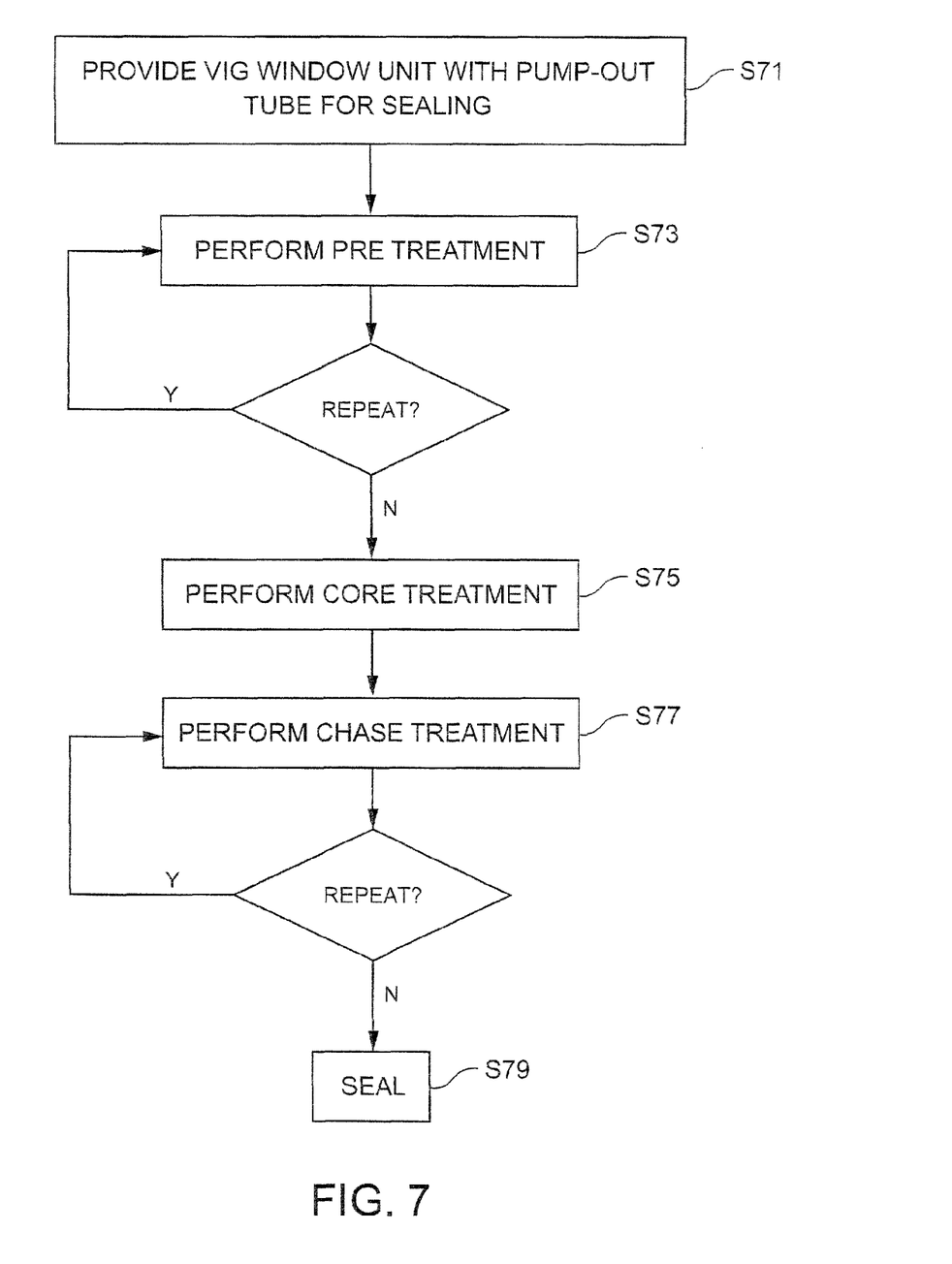
FIG. 7 is a flow chart illustrating a method of making a VIG unit according to certain example embodiments wherein sealing of the pump-out tube is performed using sequential multiple applications of laser energy using variable power settings and controlled exposure times according to certain example embodiments.

FIG. 7 is a flowchart illustrating a method for making a VIG window unit, and particularly directed to the process described above with reference to Tables 1-4. The FIG. 7 embodiment may or may not be used in combination with any of the FIG. 4-6, 8-10 embodiments. Referring to FIG. 7, at the outset, a VIG window unit having a pump-out tube 16 that is ready to be sealed is provided at S71. A heat source, such as, for example, and without limitation, a 20 W YAG laser, may be applied to perform a PRE treatment at S73. As noted above, a PRE treatment S71 is performed to pretreat the top of the tube 16 to remove impurities, contaminants, residual materials or the like and to preheat the top of the tube in preparation for melting. This PRE treatment may optionally be repeated using different power, repetition and diameters of the laser trace. After the PRE treatment is performed (S73), a CORE treatment may be performed at S75. As described above, a CORE treatment provides the bulk of the melting process. In this example, the CORE treatment is performed using a 20 W YAG laser having suitable power, repetitions and diameters of the laser trace, etc. Following the CORE treatment (S75), a series of CHASE treatments at S77 may be performed. As noted above, the CHASE treatments (S77), according to certain example non-limiting embodiments, may include a series of sequentially lower diameter laser applications at varying power and repetitions. The CHASE treatment (S77) is used to progressively direct the flow of the melt (e.g. slump) to the center of the melting top of the tube to seal the tube. The CHASE process (S77) may be repeated any suitable number of times at various settings. After/when the CHASE process (S77) is completed, the VIG window unit is sealed at S79.

Turning to still further embodiments, it may also sometimes the case that the pump-out tube may not be properly seated in the hole formed in the glass substrate. As a result, the pump-out tube may lean or tip to one side, and thus not be substantially perpendicular to the surface of the glass substrate in which the hole is formed. As a result, in situations where the pump-out tube is improperly seated and is at an undesirable angle with the surface of the glass substrate, it is difficult to properly seal the pump-out tube because the laser cannot consistently melt the tip of the pump-out tube due, for example, to differences in distance between various portions of the angled pump-out tube top and the laser source. Inconsistent melting of the top of the pump-out tube may result in incomplete sealing and thus air leakage, which may, depending on the quality of the seal, occur rapidly or more slowly over time. In addition, based on the degree of tipping of the tube, the laser could hit the tube wall instead of the top. If the laser hits the tube wall, the laser could potentially bypass the tube and hit the frit, which may damage the frit or cause undesirable outgassing into the cavity. There is a need for a way to seat the pump-out tube in the hole to reduce the amount of tipping of the tube to be within an acceptable range. As discussed below, according to certain example embodiments, this may be achieved by providing hole geometries and dimensions that assist in reducing pump-out tube tipping. Such hole geometry/dimension embodiments may or may not be used in combination with any of the embodiments of FIGS. 3-7 and/or 10.

According to certain hole geometry/dimension example embodiments, at least a portion of the hole 22 in the glass substrate 2 in which the pump-out tube 16 is inserted may be constructed such that the glass hole has a diameter sized to provide sufficient support to hold the pump-out tube in a substantially vertical orientation upon insertion in the hole, and thereafter. For example, and without limitation, according to certain example embodiments, the hole in the glass substrate into which the pump-out tube is to be inserted may be sized, for example, and without limitation, such that an inside diameter of the hole is not substantially more than about 0.1 mm greater than an outside diameter of the pump-out tube 16, and it is further preferable that the pump-out tube be inserted into the hole to such a depth as to cause the lower end of the pump-out tube (e.g., the end inserted into the hole) is substantially even with (e.g., substantially flush with) the interior surface of the glass substrate. According to further example embodiments, the pump-out tube may or may not fully extend through the hole to be flush with the interior surface of the glass substrate, and may be left just short of the interior surface by a distance of, for example, and without limitation, up to about up to 0.1 mm from the interior surface. In any event, it is noted that it is often undesirable in certain example embodiments for the pump-out tube to extend beyond the inner surface of the glass substrate and into the cavity 6 of the VIG window unit. According to certain example embodiments, the hole 22 may include a larger diameter recess formed at an outer surface of the glass substrate. The larger diameter portion of the hole, according to certain example embodiments, may form a recess portion in which excess frit, for example, may accumulate as a result of the insertion process, such as, for example, described above in connection with certain example embodiments. According to further example embodiments, the depth of the recessed portion may be between about one-fourth to one-half the thickness of the glass substrate, and may more preferably be about one-third the thickness of the glass substrate. The diameter of the larger diameter portion of the hole, according to certain example embodiments, may be in a range of about slightly greater than 0.1 mm larger than an outside diameter of the pump-out tube up to 1.0 mm larger than an outside diameter of the pump-out tube. According to certain example embodiments, a hole having an acceptable configuration to achieve the foregoing may be constructed using, for example, and without limitation, a two stage drilling process wherein a first portion of the hole is drilled from an outer surface of the glass substrate to a predetermined depth using a first drill bit, and a second portion of the hole may be drilled from an inner surface of the glass substrate to a predetermined height using a second drill bit. According to certain example embodiments, the first portion is drilled to a depth of about one-third to one half of the depth of the hole (e.g., thickness of the glass substrate). The remainder of the hole is provided by drilling the second portion from below using a second bit. According to certain example embodiments, a diameter of the drill bits) may correspond to an inner diameter of a hole formed using the bit(s). In embodiments in which a recessed portion is formed, the diameter of the first bit is larger than the diameter of the second bit.

Figure 8:
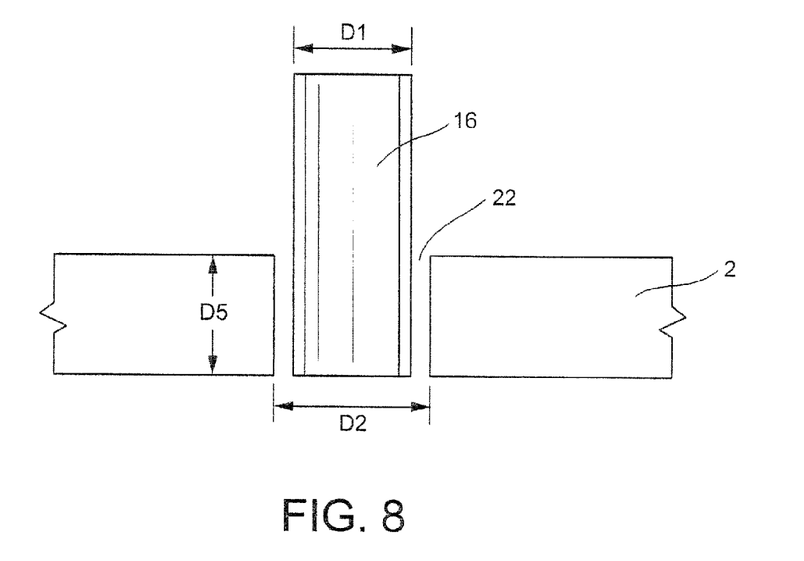
FIG. 8 is a schematic partial cross sectional diagram illustrating an example pump-out tube and hole for receiving the pump-out tube in accordance with an example embodiment.
Figure 9:
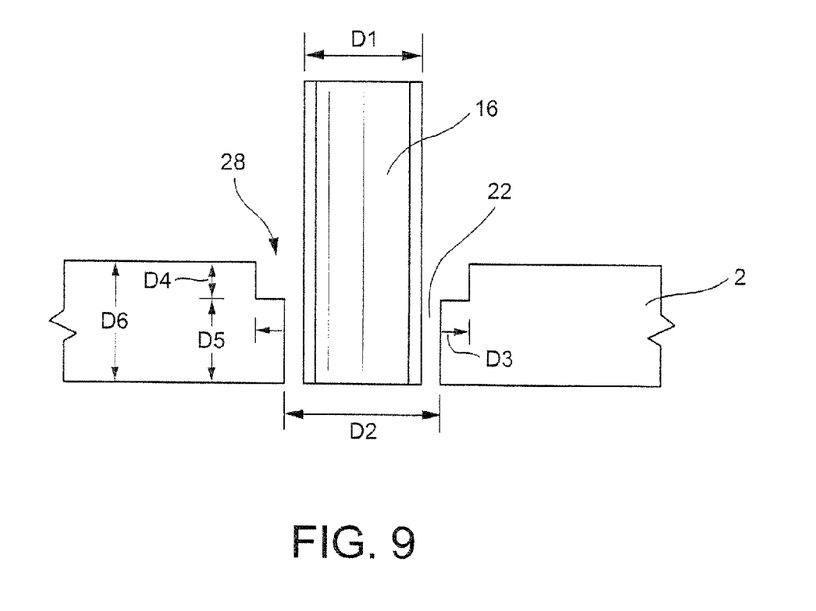
FIG. 9 is a schematic partial cross sectional diagram illustrating an example pump-out tube and hole for receiving the pump-out tube, wherein a recess having a larger diameter than the hole for receiving the pump-out tube is provided in accordance with an example embodiment.

The FIG. 8-9 embodiment(s) may or may not be used in combination with each other, and may or may not be used in combination with any of the embodiments of FIGS. 3-7 and/or 10. FIG. 8 is a schematic partial cross sectional diagram illustrating an example pump-out tube 16 and hole 22 for receiving the pump-out tube in accordance with an example embodiment. The pump-out tube 16, having an outer diameter D1 is shown inserted into a hole 22 formed in a glass substrate 22 of a VIG window unit. As discussed above, the hole 22 has dimensions that facilitate providing sufficient support to reduce or avoid undesirable tipping of the tube 16, when inserted in the hole 22. According to certain example embodiments, the inner diameter D2 of the hole 22 formed in the glass substrate 2 of the VIG unit may be in a range of from about 0.05 to 0.2 mm greater than an outer diameter D1 of the pump-out tube 16, and may be more preferably D2 may be in a range of from about 0.05 to 0.015 mm greater than D1, and even more preferably D2 may be about 0.01 mm greater than D1. In addition, according to certain example embodiments, a depth D5 of the hole 22 formed in the substrate 22 may be in a range of about one-fourth to one-half the length of the tube 16, more preferably the depth D5 of the hole formed in the substrate 22 may be in a range of about one-third to one-half the length of the tube 16, and more preferably, the depth D5 of the hole 22 formed in the substrate 2 may be about one-third the length of the tube 16.

FIG. 9 is schematic partial cross sectional diagram illustrating an example pump-out tube and hole for receiving the pump-out tube in accordance with another example embodiment. In addition to the hole 22 provided in the substrate 2 to accommodate the pump-out tube 16, as set forth above with reference to FIG. 8, the embodiment illustrated in FIG. 9 includes an optional recessed portion 28 formed in the outer surface of the glass substrate 2. This recess 28 may, for example, have a diameter D3 greater than the diameter D2 of the hole 22 in which the pump-out tube 16 is inserted. According to certain example embodiments, a diameter D3 of the recess portion 28 may preferably be in a range of 0.20 to 2 mm greater than a diameter D1 of the pump-out tube 16, or may be more preferably the diameter D3 of the recess portion 28 may be about 0.5 to 1.5 mm greater than a diameter D1 of the pump-out tube 16, or even more preferably the diameter D3 of the recess portion 28 may be about 1.0 to 2.0 mm greater than a diameter D1 of the pump-out tube 16. According to certain example embodiments, the length D5 of the pump-out tube 16 portion that is inserted in the hole 22 are preferably in the ranges discussed above with reference to FIG. 8. According to certain example embodiments, a depth D4 of the recess portion 28 may preferably be in a range of about one-fourth to one-half the thickness D6 of the glass substrate 2, or more preferably a depth D4 of the recess portion 28 may be in a range of about one-third to one-half of the thickness D6 of the glass substrate, and even more preferably a depth D4 of the recess portion 28 may be about one-third the thickness D6 of the glass substrate 2. As noted above, it is preferable that the lower end of the pump-out tube 16 be substantially flush with the inner surface of the glass substrate. The tube 16 may also be inserted such that the lower end of the tube 16 is just short of the inner surface of the glass substrate 2. For example, the lower end of the tube 16 may be indented in a range of about 0.01 to 1.0 mm from the inner surface of the glass substrate, or more preferably from about 0.05 to 0.5 mm, or even more preferably about 0.1 mm. In any case it is undesirable for a lower end of the pump-out tube 16 to extend beyond the inner surface of the glass substrate 2 and into the cavity of the VIG window unit.

Figure 10:
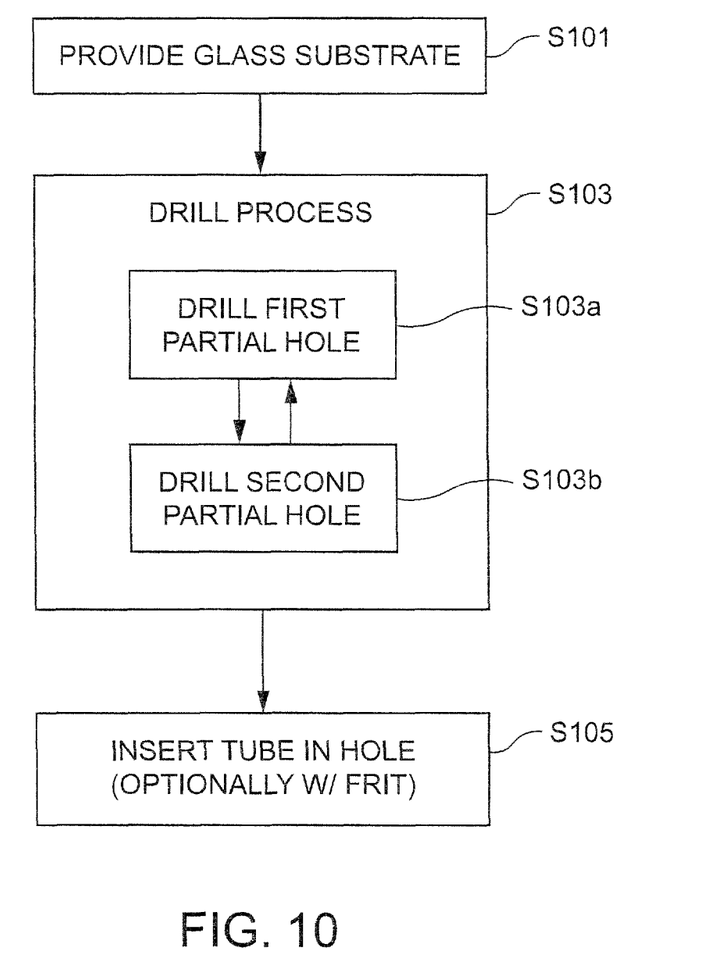
FIG. 10 is a flowchart illustrating a method for making a VIG window unit including forming a hole for receiving the pump-out tube and an optional recess according to certain example embodiments.

FIG. 10 is a flowchart illustrating a method of making a VIG window unit according to certain example embodiments. The FIG. 10 embodiment may or may not be used in combination with any of the FIG. 3-9 embodiments. The flowchart of FIG. 10 focuses on the formation of the hole 22 and/or recess portion 28 in the glass substrate 2 and the insertion of the tube 16 into the hole 22, in accordance with certain example embodiments. A glass substrate 2 (as part of and/or prior to formation of a VIG window unit) is provided at S101. According to a preferred embodiment, a dual drill method may be employed to drill the hole 22 and/or recessed portion 28. A dual drill method may be preferred because it substantially reduces glass blowout, especially at an inner surface of the glass substrate 22. The dual drill process S103 begins by first drilling a hole 22 having a given diameter D2 (or D3 for embodiments forming a recess portion 28, for example) starting from an outer surface of the glass substrate 2 toward an inner surface of the glass substrate S103a. A diameter of the bit used for this first drilling S103a preferably corresponds to an inner diameter D2 (or D3 for embodiments forming a recess portion 28, for example) of the hole 22. A second hole is then drilled up S103b from an inner surface of the substrate 2 to meet with the hole drilled in S103a. A diameter of the bit used for this second drilling S103b preferably corresponds to an inner diameter D2. In the case of a single diameter hole, such as, for example, that shown in FIG. 8, both drilling processes S103a and S103b are accomplished using similarly sized bits. However, if a recess portion 28 is to be formed, a larger bit may be used in S103a. Relative dimensions of the hole and/or recess are described above with reference to FIGS. 8 and 9. It will be understood that the order of drilling steps S103a and S103b may be interchanged and done in either order. The tube 16 is then inserted S105 into the hole 22 to a suitable depth as discussed above. Optionally, the tube by have frit applied to a lower portion thereof, for example, as described above with reference to FIGS. 2-5 prior to insertion in the hole 22.

In certain example embodiments of this invention, there is provided a method of making a vacuum insulated glass window unit, the method comprising: having a first substrate with a pump-out tube disposed in a hole formed in the first substrate; a second substrate; and an edge seal, the first and second substrates arranged to sandwich the edge seal and form a cavity therebetween; sealing an end of the pump-out tube extending out of the first substrate, the sealing comprising: (i) performing at least one preheating treatment at a top of the pump-out tube and to begin heating the top of the pump-out tube; (ii) after said pre-heating, performing at least one core heating treatment to melt the top of the pump-out tube; and (iii) performing a plurality of chase treatments using successively reduced laser trace diameters to seal the pump-out tube.

The method of the immediately preceding paragraph may further comprise evacuating the cavity between the first substrate and a second substrate to a pressure less than atmospheric pressure using the pump-out tube prior to said sealing.

In the method of any of the preceding two paragraphs, the sealing steps (i), (ii) and/or (iii) may be performed using a laser.

In the method of any of the preceding three paragraphs, the sealing steps (i), (ii) and/or (iii) may performed with a YAG laser.

In the method of any of the preceding four paragraphs, the preheating treatment may comprise applying a laser beam in a generally circular trace having a diameter of about 0.135 mm for about 8 to 12 repetitions and at a power of from about 14-18 W; said core treatment may comprise applying the laser with a trace diameter of about 0.135 mm for about 60-80 repetitions and at a power of from about 10-14 W; and/or said plurality of chase treatments may comprise: a first chase treatment applying the laser with a trace diameter of from about 0.10 to 0.14 mm for about 25-35 repetitions at a power of about 10-14 W, a second chase treatment applying the laser with a trace diameter of about 0.05 to 0.2 mm for about 10-30 repetitions at a power of from about 8-12 W, and/or a third chase treatment applying the laser with a trace diameter of from about 0.06 to 0.1 mm for about 3-10 repetitions at a power of from about 8-12 W.

In the method of any of the preceding five paragraphs, a laser movement speed may be about 25 inches/sec.

In the method of any of the preceding six paragraphs, the preheating treatment may comprise a first preheating treatment applying the laser in a generally circular trace having a diameter of about 0.1 to 0.2 mm, more preferably about 0.135 mm, for about 75-125 repetitions at a power of from about 6-10 W; and a second preheating treatment applying the laser with a smaller trace diameter of from about 0.08 to 0.150, more preferably about 0.132 mm, for about 4-10 repetitions at a power of from about 14-18 W; said core treatment may comprise applying the laser with a trace diameter of from about 0.1 to 0.2, more preferably about 0.132 mm for about 20-60 repetitions at a power of from about 10-14 W; and/or said plurality of chase treatments may comprise a first chase treatment applying the laser with a trace diameter of from about 0.1 to 0.2 mm, more preferably about 0.12 mm, for about 10-30 repetitions at a power of from about 8-12W, a second chase treatment applying the laser with a smaller trace diameter of from about 0.08-0.15, more preferably about 0.1 mm, for about 5-15 repetitions at a power of about from about 6-10 W, and/or a third chase treatment applying the laser with a still smaller trace diameter of from about 0.05 to 0.09 mm, more preferably about 0.08 mm, for about 3-10 repetitions at a power of about 4-8 W. A laser movement speed may be about 25 inches/sec.

In the method of any of the preceding seven paragraphs, the preheating treatment may comprise applying the laser in a generally circular trace having a diameter of about 0.135 mm for about 200 repetitions at a power of about 6 W; said core treatment may comprise applying the laser with a trace diameter of about 0.135 mm for about 90 repetitions at a power of about 10 W, and/or said plurality of chase treatments may comprise one or more of a first chase treatment applying the laser with a trace diameter of about 0.12 mm for about 20 repetitions at a power of about 8 W, a second chase treatment applying the laser with a trace diameter of about 0.1 mm for about 10 repetitions at a power of about 7 W, and/or a third chase treatment applying the laser with a trace diameter of about 0.08 mm for about 5 repetitions at a power of about 6 W. A laser movement speed may be about 25 inches/sec.

In the method of any of the preceding eight paragraphs, the preheating treatment may comprise applying the laser in a generally circular trace having a diameter of about 0.135 mm for about 200 repetitions at a power of about 6 W; said core treatment may comprise applying the laser with a trace diameter of about 0.135 mm for about 70 repetitions at a power of about 12 W; and/or said plurality of chase treatments may comprise a first chase treatment applying the laser with a trace diameter of about 0.12 mm for about 20 repetitions at a power of about 8 W, a second chase treatment applying the laser with a trace diameter of about 0.1 mm for about 10 repetitions at a power of about 7 W, and/or a third chase treatment applying the laser with a trace diameter of about 0.08 mm for about 5 repetitions at a power of about 6 W. A laser movement speed may be about 25 inches/sec.

In certain example embodiments of this invention, there may be provided a method of making a vacuum insulated glass window unit, the method comprising: sealing an end of a pump-out tube extending out of a first substrate of the vacuum insulated glass window unit, the sealing comprising: performing at least one preheating treatment; performing at least one core heating treatment; and performing a plurality of chase treatments using successively reduced laser trace diameters.

The method of the immediately preceding paragraph may further comprise evacuating a cavity formed between the first substrate and a second substrate of the vacuum insulated glass window unit to a pressure less than atmospheric pressure via the pump-out tube prior to the sealing.

In the method of any of the preceding two paragraphs, the sealing may be performed using a laser.

In the method of any of the preceding three paragraphs, the sealing may be performed with a 20 W YAG laser.

In the method of any of the preceding four paragraphs, said preheating treatment may clean a top of the pump-out tube and/or begin heating the top of the pump-out tube.

In the method of any of the preceding five paragraphs, said core treatment may begin melting the top of the pump-out tube.

In the method of any of the preceding six paragraphs, the chase treatments may seal the end of the pump-out tube.

In the method of any of the preceding seven paragraphs, the pump-out tube may not be melted during the preheating treatment.

The method of any of the preceding sixteen paragraphs may further comprise providing a hole defined in the first substrate, applying a frit inclusive paste to at least a lower portion of a pump-out tube, and inserting an end of the pump-out tube on which the fit inclusive paste has been applied into the hole defined in the first substrate. The method may further comprise drying the fit inclusive paste after the pump-out tube has been inserted in the hole in the first substrate, and/or firing at least part of the first substrate with the pump-out tube inserted therein to form a hermetic seal between the pump-out tube and the substrate.

While certain example embodiments have been described and disclosed herein, it will be understood that the embodiments described herein are intended to be illustrative, not limiting, and that those skilled in the art will understand that various modifications may be made without departing from the true spirit and full scope of the claims appended hereto.

What is claimed is:

1. A method of making a vacuum insulated glass window unit, the method comprising:
   having a first substrate with a pump-out tube disposed in a hole formed in the first substrate; a second substrate; and an edge seal, the first and second substrates arranged to sandwich the edge seal and form a cavity therebetween;
   sealing an end of the pump-out tube extending out of the first substrate, the sealing comprising: (i) performing at least one preheating treatment at a top of the pump-out tube and to begin heating the top of the pump-out tube; (ii) after said pre-heating, performing at least one core heating treatment to melt the top of the pump-out tube; and (iii) performing a plurality of chase treatments using successively reduced laser trace diameters to seal the pump-out tube.

2. The method of claim 1, further comprising evacuating the cavity between the first substrate and a second substrate to a pressure less than atmospheric pressure using the pump-out tube prior to said sealing.

3. The method of claim 1, wherein the sealing steps (i), (ii) and (iii) are performed using a laser.

4. The method of claim 1, wherein the sealing steps (i), (ii) and (iii) are performed with a YAG laser.

5. The method of claim 1, wherein the preheating treatment comprises applying a laser beam in a generally circular trace having a diameter of about 0.135 mm for about 8 to 12 repetitions and at a power of from about 14-18 W;
   said core treatment comprises applying the laser with a trace diameter of about 0.135 mm for about 60-80 repetitions and at a power of form about 10-14 W; and
   said plurality of chase treatments comprise: a first chase treatment applying the laser with a trace diameter of from about 0.10 to 0.14 mm for about 25-35 repetitions at a power of about 10-14 W; a second chase treatment applying the laser with a trace diameter of about 0.05 to 0.2 mm for about 10-30 repetitions at a power of from about 8-12 W; and a third chase treatment applying the laser with a trace diameter of from about 0.06 to 0.1 mm for about 3-10 repetitions at a power of from about 8-12 W.

6. The method of claim 5, wherein a laser movement speed is about 25 inches/sec.

7. The method of claim 1, wherein the preheating treatment comprises: a first preheating treatment applying the laser in a generally circular trace having a diameter of about 0.1 to 0.2 mm, for about 75-125 repetitions at a power of from about 6-10 W; and a second preheating treatment applying the laser with a smaller trace diameter of from about 0.08 to 0.150, for about 4-10 repetitions at a power of from about 14-18 W;
   said core treatment comprises: applying the laser with a trace diameter of from about 0.1 to 0.2, for about 20-60 repetitions at a power of from about 10-14 W; and
   said plurality of chase treatments comprise: a first chase treatment applying the laser with a trace diameter of from about 0.1 to 0.2 mm, for about 10-30 repetitions at a power of from about 8-12 W; a second chase treatment applying the laser with a smaller trace diameter of from about 0.08-0.15, for about 5-15 repetitions at a power of about from about 6-10 W; and a third chase treatment applying the laser with a still smaller trace diameter of from about 0.05 to 0.09 mm, for about 3-10 repetitions at a power of about 4-8 W.

8. The method of claim 7, wherein a laser movement speed is about 25 inches/sec.

9. The method of claim 1, wherein the preheating treatment comprises: applying the laser in a generally circular trace having a diameter of about 0.135 mm for about 200 repetitions at a power of about 6 W;
   said core treatment comprises: applying the laser with a trace diameter of about 0.135 mm for about 90 repetitions at a power of about 10 W; and
   said plurality of chase treatments comprise: a first chase treatment applying the laser with a trace diameter of about 0.12 mm for about 20 repetitions at a power of about 8 W; a second chase treatment applying the laser with a trace diameter of about 0.1 mm for about 10 repetitions at a power of about 7 W; and a third chase treatment applying the laser with a trace diameter of about 0.08 mm for about 5 repetitions at a power of about 6 W.

10. The method of claim 9, wherein a laser movement speed is about 25 inches/sec.

11. The method of claim 1, wherein the preheating treatment comprises: applying the laser in a generally circular trace having a diameter of about 0.135 mm for about 200 repetitions at a power of about 6 W;

said core treatment comprises: applying the laser with a trace diameter of about 0.135 mm for about 70 repetitions at a power of about 12 W; and said plurality of chase treatments comprise: a first chase treatment applying the laser with a trace diameter of about 0.12 mm for about 20 repetitions at a power of about 8 W; a second chase treatment applying the laser with a trace diameter of about 0.1 mm for about 10 repetitions at a power of about 7 W; and a third chase treatment applying the laser with a trace diameter of about 0.08 mm for about 5 repetitions at a power of about 6 W.

12. The method of claim 11, wherein a laser movement speed is about 25 inches/sec.

13. A method of making a vacuum insulated glass window unit, the method comprising:

sealing an end of a pump-out tube extending out of a first substrate of the vacuum insulated glass window unit, the sealing comprising:
performing at least one preheating treatment;
performing at least one core heating treatment; and
performing a plurality of chase treatments using successively reduced laser trace diameters.

14. The method of claim 13, further comprising evacuating a cavity formed between the first substrate and a second substrate of the vacuum insulated glass window unit to a pressure less than atmospheric pressure via the pump-out tube prior to the sealing.

15. The method of claim 13, wherein the sealing is performed using a laser.

16. The method of claim 13, wherein the sealing is performed using a 20 W YAG laser.

17. The method of claim 13, wherein said preheating treatment cleans a top of the pump-out tube and begins heating the top of the pump-out tube.

18. The method of claim 13, wherein said core treatment begins melting of a top of the pump-out tube.

19. The method of claim 13, wherein the chase treatments seal the end of the pump-out tube.

20. The method of claim 13, wherein the pump-out tube is not melted during the preheating treatment.

* * * * *